(12) United States Patent
Annadurai et al.

(10) Patent No.: US 7,684,442 B2
(45) Date of Patent: Mar. 23, 2010

(54) METHOD AND CIRCUIT FOR PROCESSING DATA IN COMMUNICATION NETWORKS

(76) Inventors: Andy Annadurai, 5112 Amberwood Dr., Fremont, CA (US) 94555; Chris Tsu, 13625 Surrey La., Saratoga, CA (US) 95070; Feng Han, 1541 Poppybank Ct., Pleasanton, CA (US) 94566

( * ) Notice: Subject to any disclaimer, the term of this patent is extended or adjusted under 35 U.S.C. 154(b) by 446 days.

(21) Appl. No.: 11/514,379

(22) Filed: Aug. 30, 2006

(65) Prior Publication Data

US 2007/0076624 A1 Apr. 5, 2007

Related U.S. Application Data

(63) Continuation of application No. 10/067,465, filed on Feb. 4, 2002, now Pat. No. 7,292,607.

(51) Int. Cl.
*H04J 3/06* (2006.01)
*H04L 12/28* (2006.01)
(52) U.S. Cl. .................................. 370/503; 370/907
(58) Field of Classification Search ................. 370/503, 370/512–516, 907; 398/25, 30, 154; 709/236; 710/29–30, 33
See application file for complete search history.

(56) References Cited

U.S. PATENT DOCUMENTS

| 4,899,383 | A | * | 2/1990 | Einolf et al. ................ 370/510 |
| 5,027,407 | A | * | 6/1991 | Tsunoda ..................... 704/239 |
| 5,081,654 | A | * | 1/1992 | Stephenson et al. ......... 375/368 |
| 5,132,991 | A |   | 7/1992 | McNesby et al. |
| 5,136,587 | A | * | 8/1992 | Obana et al. ................ 370/535 |
| 5,241,543 | A | * | 8/1993 | Amada et al. ............... 370/509 |
| 5,666,351 | A | * | 9/1997 | Oksanen et al. ............. 370/474 |
| 5,710,774 | A |   | 1/1998 | Suh et al. |
| 5,923,653 | A | * | 7/1999 | Denton ....................... 370/375 |
| 6,359,908 | B1 |   | 3/2002 | Soda |
| 6,385,213 | B1 | * | 5/2002 | Nakamura et al. .......... 370/513 |
| 6,470,034 | B1 |   | 10/2002 | Tan |
| 6,728,492 | B1 | * | 4/2004 | Baroncelli .................. 398/154 |
| 6,961,348 | B2 |   | 11/2005 | Yu |
| 7,352,777 | B2 | * | 4/2008 | Caia .......................... 370/503 |
| 2002/0191640 | A1 |   | 12/2002 | Haymes et al. |
| 2003/0091041 | A1 | * | 5/2003 | Caia .......................... 370/386 |
| 2003/0161355 | A1 | * | 8/2003 | Falcomato et al. .......... 370/539 |

* cited by examiner

*Primary Examiner*—William Trost, IV
*Assistant Examiner*—Roberta A Shand
(74) *Attorney, Agent, or Firm*—McDonnell Boehnen Hulbert & Berghoff LLP

(57) ABSTRACT

A method and circuitry for detecting a pattern in received data such as the A1A2 boundary in a SONET frame after deserialization. Two consecutive pluralities of bytes of incoming data are stored and compared with the A1 and A2 values (or bit shifted versions of the A1 and A2 values) until the boundary is detected. The data are then bit shifted so that every byte on the bus is either A2 or A1. A new aligned data bus is then formed such that the last A1 bit occurs on the data bus for a given clock cycle and the first A2 bit occurs on the data bus during the next clock cycle.

18 Claims, 10 Drawing Sheets

METHOD AND CIRCUIT FOR PROCESSING DATA IN COMMUNICATION NETWORKS

CROSS-REFERENCE TO RELATED APPLICATIONS

This application is a continuation of U.S. patent application Ser. No. 10/067,465, filed on Feb. 4, 2002, entitled "Method And Circuit For Processing Data In Communication Networks", which is hereby expressly incorporated by reference for all purposes.

BACKGROUND OF THE INVENTION

The invention relates to the field of data processing in communications networks and more specifically to a method and circuit for detecting standard patterns in data such as those found in header bytes SONET-based telecommunication systems.

In some telecommunication systems, data is transmitted with a predetermined structure called the frame. The frame typically contains a header (or overhead) section where information about the particular flame resides, and a payload section where the actual data resides. Different data transmission protocols may required different data frame. For example, SONET (Synchronous Optical Network) which is a transmission multiplexing standard for high-speed data communications within North America, has as its basic building block a 51.84 Mb/s, OC-1 (Optical Carrier 1) flame. The organization of an OC-1 frame 24 is depicted in FIG. 7. The structure of the OC-1 frame 24 can be thought of as a two dimensional matrix having nine rows 25 with each row 25 containing 90 bytes of data. The flame's data is transmitted row by row, from left to right with the most significant bit (MSB) of each byte being transmitted first The first three columns of each frame form the header section that is divided between section overhead 26 and line overhead 27 as shown. The remainder of the flame carries the synchronous payload envelope (SPE) 28 containing the data. The section overhead 26 includes a series of named bytes. Two of the named bytes, A1 and A2 signal the start of the OC-1 frame. According to the SONET standard, the A1 byte has a value F6 in hexadecimal (1111_0110 in binary) and the A2 byte has a value of 28 (0010_1000 in binary).

To achieve high data rates, multiple frame-aligned OC-1 signals are multiplexed to form a higher frequency OC-N signal. FIG. 7 shows an OC-N signal 23 which is made up of N OC-1 frames (24, 24a, 24b, etc.). The OC-N signal 23 allows the system to operate at a frequency of (N)×(51.84 Mb/s). As shown in FIG. 7, the OC-N signal 23 can be viewed as a three dimensional frame having a depth of N tiers, each of which is an OC-1 frame 24. In SONET, data is transmitted serially with the sequence of byte transmission indexed first by tier depth N then by row then by column. So the A1 byte of OC-1 frame 24 would be transmitted first, followed by the A1 byte of OC-1 frame 24a, followed by the A1 byte of OC-1 frame 24b, etc. After the A1 bytes of all N OC-1 frames are transmitted, the sequence steps along the row, and the A2 bytes of the OC-1 frames, 24, 24a, 24b, etc. are transmitted. The beginning pattern for an OC-N SONET signal is thus N consecutive A1 bytes (A1=F6) followed by N consecutive A2 bytes (A2=28). This distinctive sequence must be detected by a SONET receiver in order to distinguish the start of an OC-N frame.

At the receiver end, the serial SONET data is first deserialized from a serial bitstream onto a multiple-bit (e.g., 16 bit) wide parallel data bus by a SERDES (Serializer/Deserializer) chip. The 16 bit wide bus is then further deserialized into a 128-bit wide parallel bus for data processing in an OC-N framer chip. Since data arrives from the optical fiber as a serial bitstream, the data on the 128 bit bus, after the two deserializing steps, may not fall on the A1A2 boundary. A method is needed to rearrange the data and align it in such a way that the data aligns along the A1A2 boundary.

Several methods of accomplishing this data alignment are known in the art. For example, one known method compares the 128 bits of data on the data bus with A1 and A2 directly. As the A1A2 boundary can fall on any of the 128 bits, detecting the A1A2 boundary in one clock cycle according to this method requires 128, 128-bit comparators. The circuitry needed to accomplish detection of the A1A2 boundary according to this method is too large to be commercially practicable. Assuming state of the art 0.18 micron process technology, a single 128 bit comparator has about 4,500 unit cells. Implementation of 128 such comparators would thus require 756,000 unit cells. Realignment by this method would also require 128, 128-to-1 multiplexers, each of which requires 3,000 unit cells to implement. The total unit cell cost of the known direct comparison method is 1,100,000 unit cells, which is quite expensive.

An alternative method requires only one 128-bit comparator which directly compares the 128-bit data bus with A1 and A2. In order to cover all possible locations of the A1A2 boundary, this second method shifts the 128-bit register one bit between every comparison until the boundary is found. This method has the advantage of requiring much less circuitry to implement, but requires potentially 128 clock cycles to detect the A1A2 boundary. Such a long delay is not acceptable in real time data processing.

A third method for detecting the A1A2 boundary moves the detection logic one level closer to the line level. If detection can be performed at the input to the OC-N framer, on a 16-bit wide bus, unit cell savings can be realized. The shortcoming with this method is that the comparison has to be made at a much higher clock frequency (622 MHz), which is a difficult timing requirement to meet.

What is needed is a method and circuitry for detecting data patterns such as the A1A2 boundary in an OC-N SONET frame using a small number of clock cycles and minimal circuit overhead.

BRIEF SUMMARY OF THE INVENTION

The present invention provides methods and circuitry for detecting standard patterns in received data such as the A1A2 boundary in a SONET frame. In a specific embodiment, the present invention detects the SONET frame A1A2 boundary and realigns the data along the A1A2 boundary in as little as five clock cycles with a minimum of logic circuitry.

A method according to embodiments of the present invention detects the A1A2 boundary by monitoring half the bytes on a data bus for two consecutive clock cycles. The boundary is detected if all of the monitored bytes for the first cycle equal A1*, which is A1 or any bit shifted value thereof, and all of the monitored bytes for the subsequent cycle equal A2*, which is A2 or any bit shifted value thereof. Aspects of the present invention provide for storing the first set of data bus values in a first data register to facilitate the comparison. Another aspect of the invention allows detection of the A1A2 boundary on a 128-bit bus. Additional aspects of the invention enable detection of the A1A2 boundary in any OC-N SONET frame. Other aspects of the invention allow for detection of the A1A2 boundary by monitoring 8 bytes on the data bus per clock cycle.

A method according to the present invention is provided for bit shifting SONET data on a data bus such that each byte on the shifted bus equals either A1 or A2. Other aspects of the present invention apply the bit shifting method to a 128-bit wide data bus. In some aspects of the present invention, 8 bytes of data on the data bus are compared with predetermined values for each of two clock cycles in order to determine the extent to which the output bus should be bit shifted.

Other aspects of the present invention are provided for byte shifting data on a SONET data bus such that all the bytes of at least one clock cycle are equal to A1 and all the bytes of on the bus during a subsequent clock cycle are all equal to A2.

According to one embodiment of the present invention circuitry for detecting the A1A2 boundary in a SONET frame includes a first data register for storing the values on a SONET data bus and a comparator for comparing some portion of the stored values with a set of predetermined values and for comparing some portion of the data bus values with predetermined values. Other aspects of the present invention provide a bit select output from a comparator, the value of the bit select being determined by the difference between the values of bytes in the first data register and predetermined values. Other aspects of the present invention provide a second data register coupled to the first data register for storing the first data register's values on a subsequent clock cycle.

Other embodiments of the present invention provide a bit shifter for mapping a SONET data bus onto a new bus such that each SONET header byte in the new bus equals either A1 or A2. Other aspects of the present invention provide for the bit shifter to take input from the bit select as well as from the first and second data registers. Another embodiment of the present invention includes a bit shifter realized as an array of multiplexers. Another embodiment of the present invention provides a third data register to store the bit shifted bus and a fourth data register to store the values in the third data register on a subsequent clock cycle.

Alternate embodiments of the present invention shift data on a SONET data bus such that the data are aligned along the A1A2 boundary. Some aspects of the present invention provide a byte selection circuitry that takes input from the third data register to determine the location of the A1A2 boundary with respect to the edge of the SONET data bus. Other embodiments provide that the byte select circuitry outputs a byte select bus. Other aspects of the present invention provide a byte shifter that takes as input the byte select bus as well as the outputs of the third and fourth data register, and outputs a new data bus, byte shifted such that bus data are aligned along the A1A2 boundary. Alternative embodiments of the invention provide a fifth data register to store the aligned bus values prior to output

DETAILED DESCRIPTION OF THE INVENTION

Figure 1:
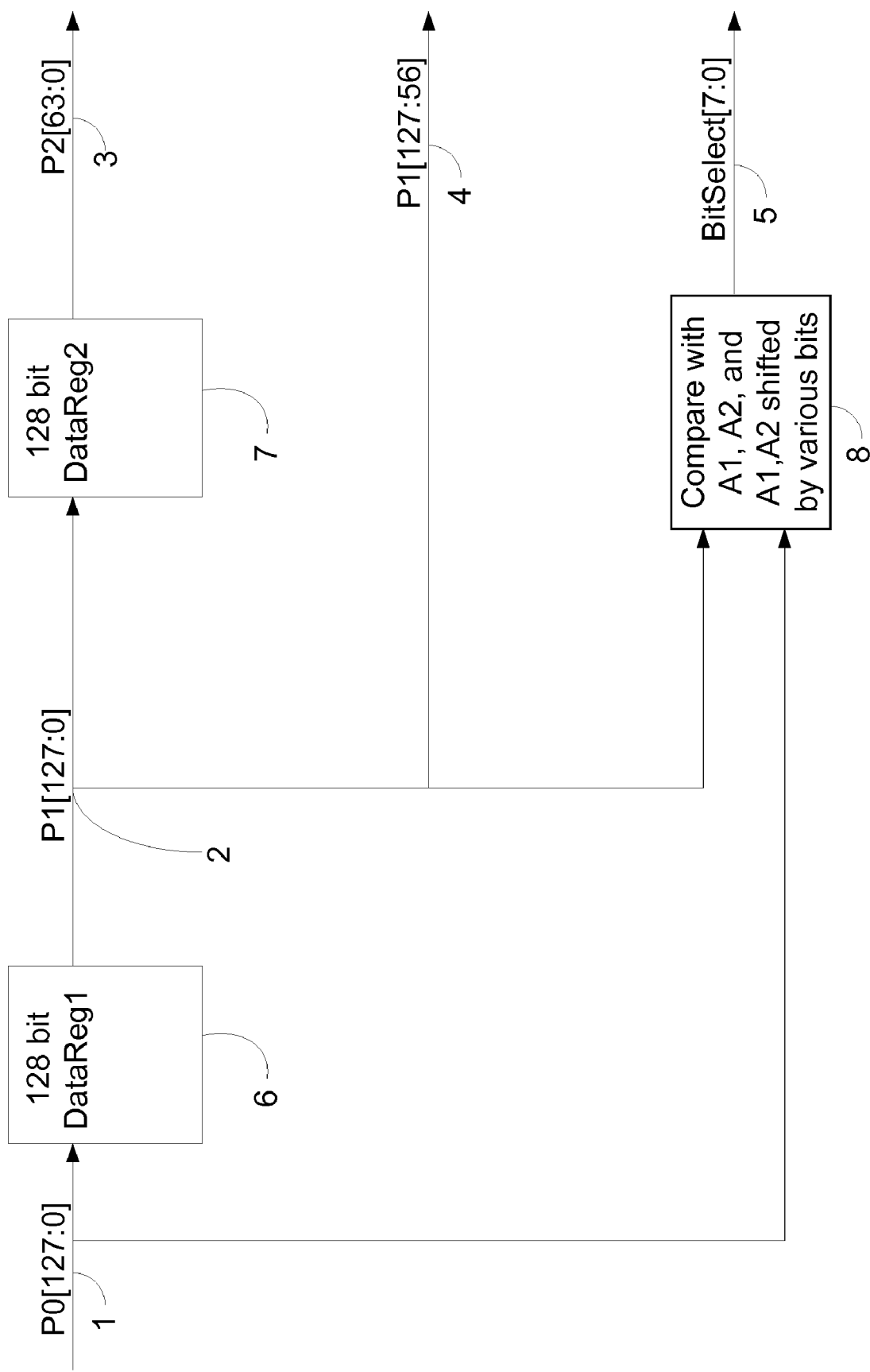
FIG. 1 is a datapath block diagram illustrating an A1A2 boundary detection technique according to an embodiment of the present invention.

Referring to FIG. 1, there is shown a simplified datapath block diagram for detecting the A1A2 boundary in a SONET frame according to one embodiment of the present invention. Serial data P0[127:0] arrives on an input line 1 after having undergone optical-to-electrical conversion. The incoming data P0[127:0] is loaded sequentially into two multi-bit (e.g. 128 bit) data registers, DataReg1 6 and DataReg2 7 as shown. Various specific embodiments of the present invention are described herein in the context of a SONET framer implemented using 128 bit wide bus. It is to be understood, however, that the specific bus width or other implementation-specific values and numbers provided herein are for illustrative purposes only, and that the invention applies to telecommunication systems with other implementations. In the exemplary implementation shown in FIG. 1, each of the registers DataReg1 6 and DataReg2 7 is a 128 bit register accommodating 16 8-bit bytes of data. The registers are designed to store two consecutive 128-bit data with DataReg2 storing the first 128-bit data, and DataReg1 storing the immediately following 128-bit data. Breaking down the data stream into pairs of bytes, the data flow in time at the inputs and outputs of the registers is as follows:

P2[127:112], P2[111:96], P2[95:80], P2[79:64], P2[63:48], P2[47:32], P2[31:16], P2[15:0],

P1[127:112], P1[111:96], P1[95:80], P1[79:64], P1 [63:48], P1[47:32], P1[31:16], P1[15:0],

P0[127:112], P0[111:96], P0[95:80], P0[79:64], P0[63:48], P0[47:32], P0[31:16], P0[15:0], where P2[127:112] arrives at the framer's input first, and P0[15:0] arrives at the framer's input last.

Figure 2:
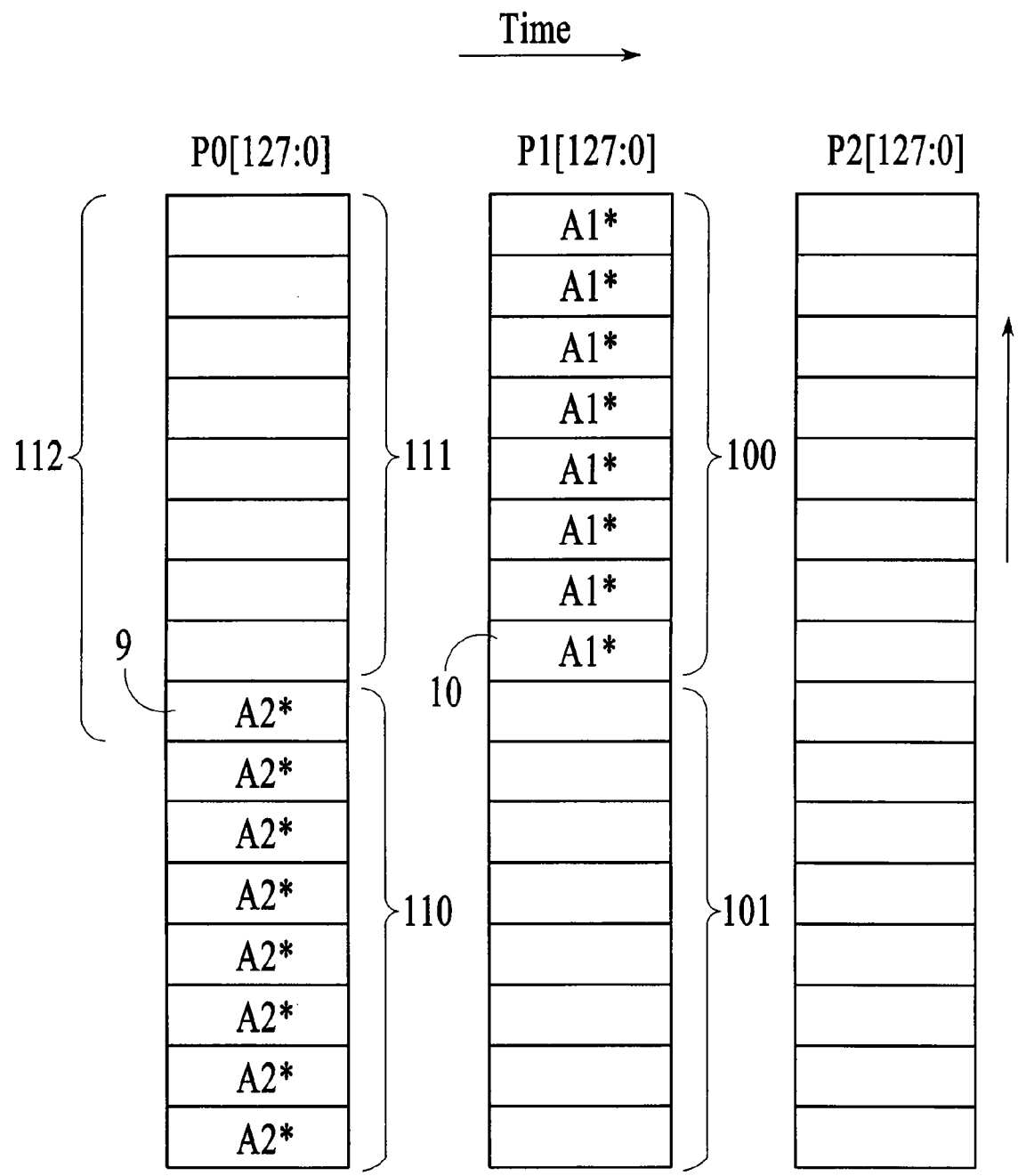
FIG. 2 shows the time varying states of the two data registers of FIG. 1 as well as the contents of the incoming 128-bit data bus.

FIG. 2 provides a depiction of the data flow through the registers in time. A lower block 110 of 64 bits of P0[127:0] data on the data input line 1 is defined by byte number 9 and below, and an upper block 100 of 64 bits of P1 [127:0] data is defined by byte number 10 and above, as shown. These 64 bit blocks are designated P0[63:0] 110 and P1[127:64] 100, respectively. In terms of the sequence of arrival, P1[127:64] 100 arrives first, followed by P1[63:0] 101, followed by P0[127:64] 111, followed by P0[63:0] 110. When the header of an OC-N frame arrives, at some point in time, each byte in P0[63:0] 110 will have a value of A2* and each byte in P1[127:64] 100 will have a value of A1*. A2* is either A2 itself, or A2 bit shifted in binary. A1* is either A1 itself or A1 bit shifted in binary. In the exemplary embodiment described herein, A1* is defined as any of the following binary values: A1 itself: 1111_0110, A1 left shifted 1 bit: 1110_1101, A1 left shifted 2 bits: 1101_1011, A1 left shifted 3 bits: 1011_0111, A1 left shifted 4 bits: 0110_1111, A1 left shifted 5 bits: 1101_1110, A1 left shifted 6 bits: 1011_1101, or A1 left shifted 7 bits: 0111_1011. Similarly, A2* is defined as any of the following binary values: A2 itself: 0010_1000, A2 left shifted 1 bit: 0101_0000, A2 left shifted 2 bits: 1010_0000, A2 left shifted 3 bits: 0100_0001, A2 left shifted 4 bits: 1000_0010, A2 left shifted 5 bits: 0000_0101, A2 left shifted 6 bits: 0000_1010, or A2 left shifted 7 bits: 0001_0100.

When each byte in the block P0[63:0] 110 equals A2* and each byte in the block P1[127:64] 100 equals A1*, the A1A2 boundary must be somewhere among the 136 bits formed by P1[63:0] 101 and P0[127:56] 112. One extra byte is included in this window because of the possibility that A1* and A2* will actually be shifted 7 bits from the A1 and A2 values. According to this embodiment of the present invention, the data in P1[127:64] 100 of the first data register 6 and the data in P0[63:0] 110 of the data input are compared by a comparator 8 (in FIG. 1) with A1* and A2*, respectively. When matches between all 8 bytes in P1[127:64] and A1* and all eight bytes in P0[63:0] and A2* are detected by the comparator, the A1A2 boundary has been detected.

Figure 8:
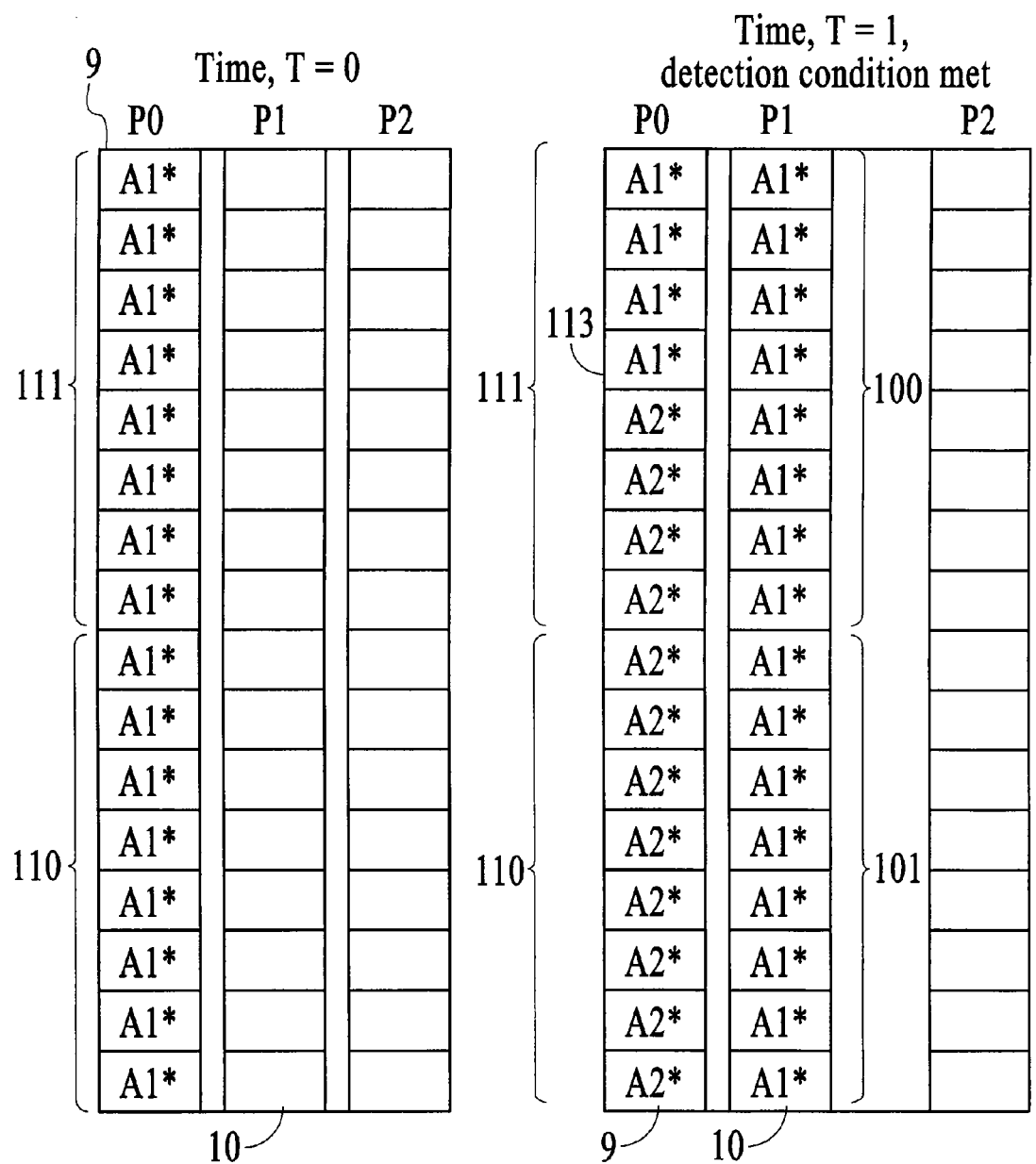
FIG. 8 shows the A1A2 detection method when the A1A2 boundary is in the upper half of the input bus.

FIG. 8 depicts an exemplary condition whereby the A1A2 boundary is detected according to the present invention. There is shown the situation where the A1A2 boundary 113 occurs among the first 64 bits of the 128-bit bus, which is to say, somewhere in P0[127:64]. Referring to FIG. 8, at time T=0, P0[127:0] 9 is composed entirely of A1* bytes. At time T=1, the subsequent clock cycle, the prior P0[127:0] values have been clocked into the first data register and are now represented by P1[127:0] 10. The A1A2 boundary 113 now occurs on the incoming data bus among the block P0[127:64] 111. Under these conditions, detection of the A1A2 boundary 113 occurs at time T=1 since P1[127:64] 100 all equal A1* and P0[63:0] 110 all equal A2*.

Figure 9:
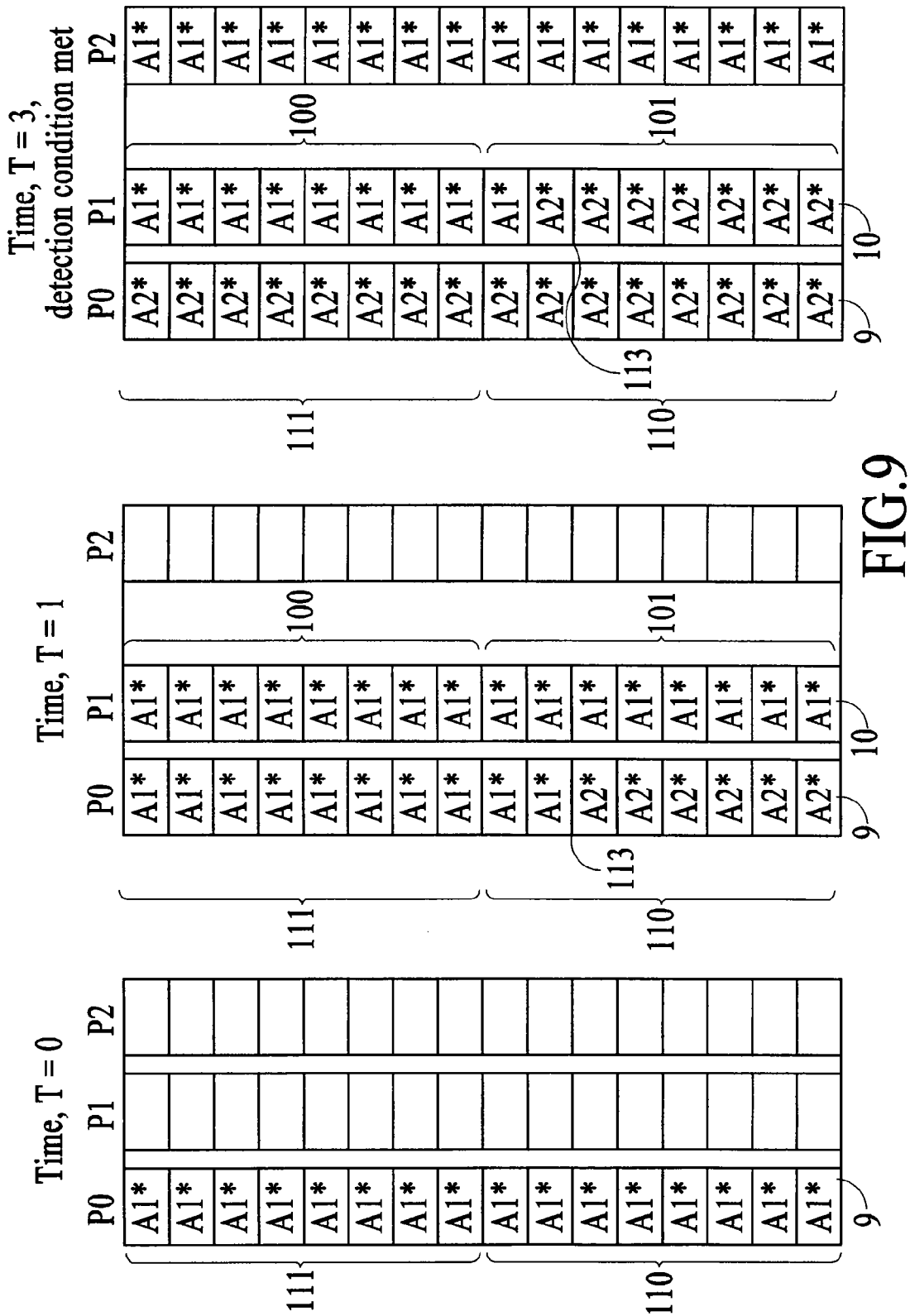
FIG. 9 shows the A1A2 detection method when the A1A2 boundary is in the lower half of the input bus.

FIG. 9 illustrates how the method of the present invention detects the A1A2 boundary when it occurs among the last 64 bits in the data bus, P0[63:0] 110. At time T=0, P0[127:0] 9 is composed entirely of A1*. At time T=1, the subsequent clock cycle, P0[127:0] 9 contains the A1 A2 boundary in the last half of the register P0[63:0] 110. At time T=2, the prior values P0 have been clocked into the first data register and are represented by the values P1 [127:0] 10. At time T=2, the A1A2 boundary 113 occurs in the lower half of P1 or P1[63:0] 101. When this occurs the blocks of the upper half of P1, P1[127:64] 100 all equal A1* and the blocks of the lower half of P0, P0[63:0] 110 all equal A2*. The detection condition, in this case, occurs after 3 clock cycles rather than in 2, as in FIG. 8.

Referring again to FIG. 1, there is shown a comparator 8 receiving input from the incoming data bus 1 and DataReg1 6 according to the method described above. The comparator compares the values of the lower half of the data input bus P0[63:0] 9 with the values of the upper half of DataReg1 10 with eight bytes of A2* and eight bytes of A1* respectively. In one embodiment of the invention, the comparator is realized by an array of eight 128-bit comparators (not shown). Based on the values of A1* and A2*, the comparator 8 generates output control bits on a bit selection control bus, BitSelect[7:0]5. These control bits are used to shift the data in each byte, so that the data in each byte is either A1 or A2

Figure 3:
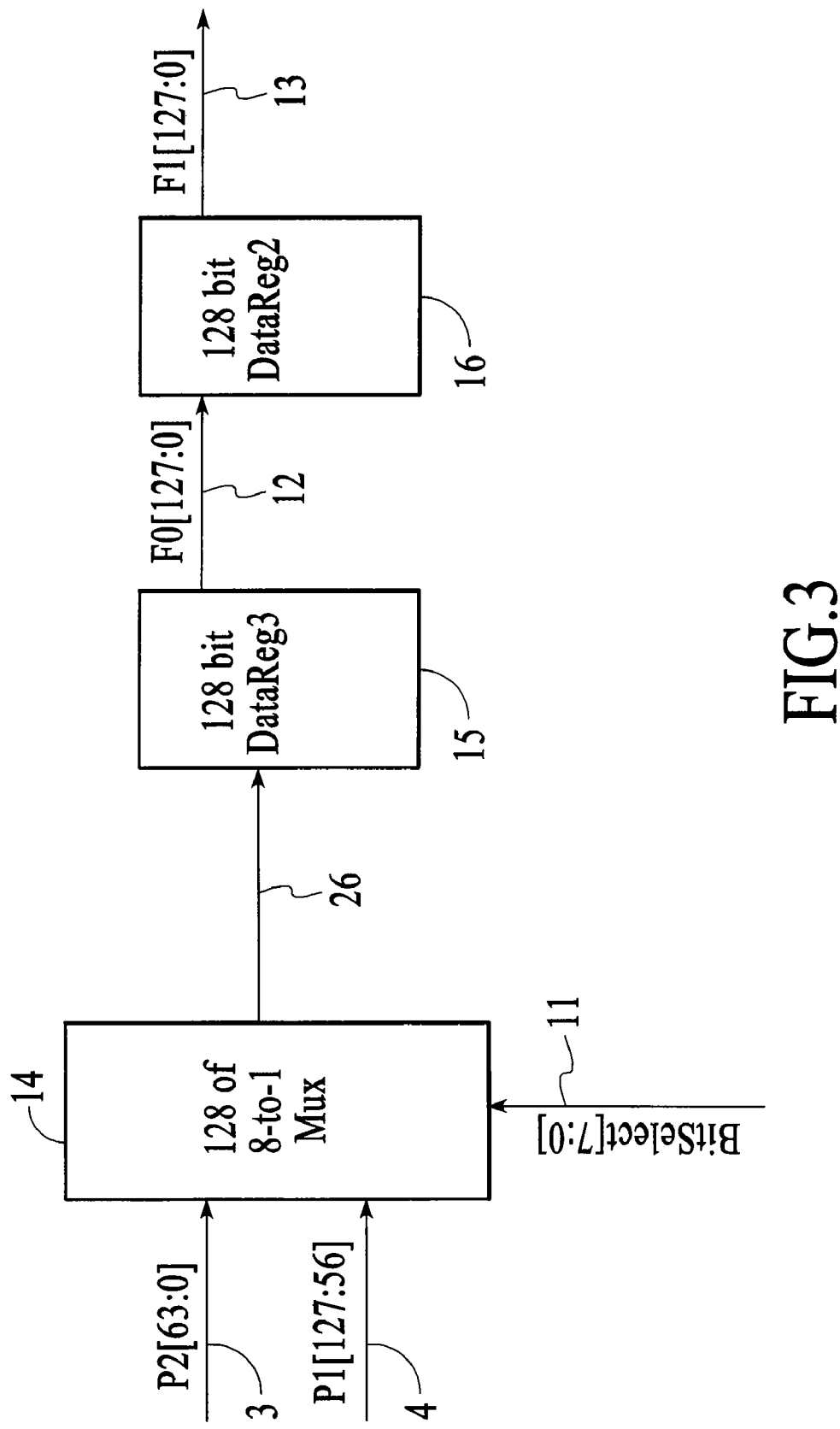
FIG. 3 shows a datapath block diagram of bit realignment of the data bus according an embodiment of the present invention.
Figure 4:
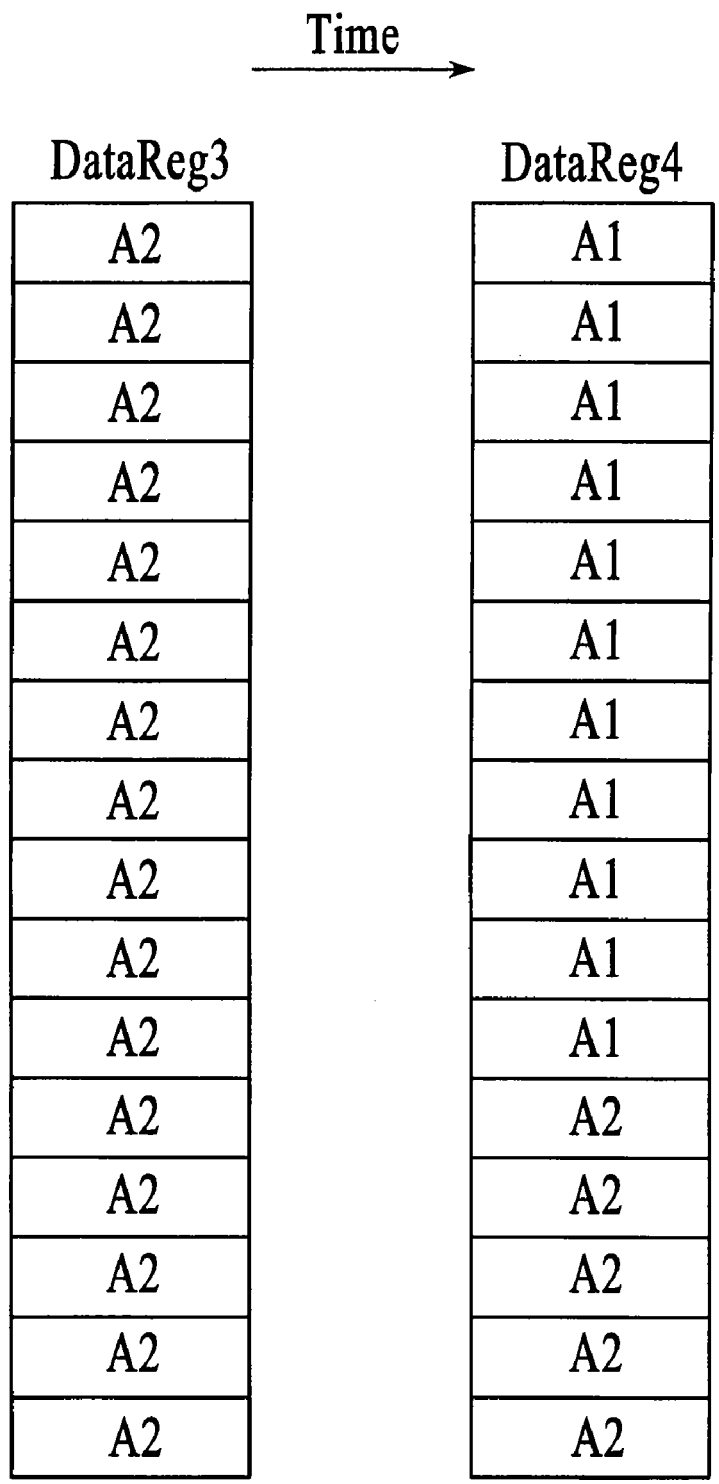
FIG. 4 shows the states of two data registers comprising bit aligned data according to an embodiment of the present invention.

In the method of the invention described above, it was demonstrated that the A1A2 boundary occurs among the 136 bits formed by P1[63:0] 2, and P0[127:56] 1. Since the comparison takes one clock cycle to generate the control signal on BitSelect[7:0] 5, one clock cycle delay is needed to compensate the clock difference between the BitSelect[7:0] and the data bus. In order to realign the data in accordance with the extent of the bit shift, the invention reconfigures P2[63:0] 3 and P1 [127:56] 4 to form a single realigned 128 bit long data. FIG. 3 shows in more detail how an exemplary embodiment of the present invention accomplishes the bit alignment of the data. In this example, a multiplexer array 14 includes 128 8-to-1 multiplexers and receives signals P2[63:0] 3 and P1[127:56] 4 at its inputs as shown. These values represent portions of the contents of DataReg1 6 and DataReg2 7 respectively. Together, P2[63:0] 3 and P1[127:56] 4 represent 136 sequential bits from the original serial data stream. Multiplexer array 14 receives the Bit Select[7:0] signal at its select input 11. The control signal BitSelect[7:0] is used to shift the data in the new data bus 26 at the output of the multiplexer array 14. In the exemplary embodiment described herein, the shift amount is from 0 to 7 bits, so that each byte in the 128 bit output data bus 26 is either A1 or A2, as shown in FIG. 4. The multiplexer array 14 thus shifts the data P2[63:0] 3 and P1[127:56] 4 into a third 128-bit register 15 such that each 8-bit block of DataReg3 15 contains only A1 or A2. The shifted data are stored in DataReg3 15 as well as another sequential register, DataReg4 16. The values of these two registers are represented by F0[127:0] 12 and F1[127:0] 13, respectively. The bit alignment step according to this embodiment of the invention requires two clock cycles to complete. The values of DataReg3 and DataReg4 are shown in FIG. 4.

Figure 5:
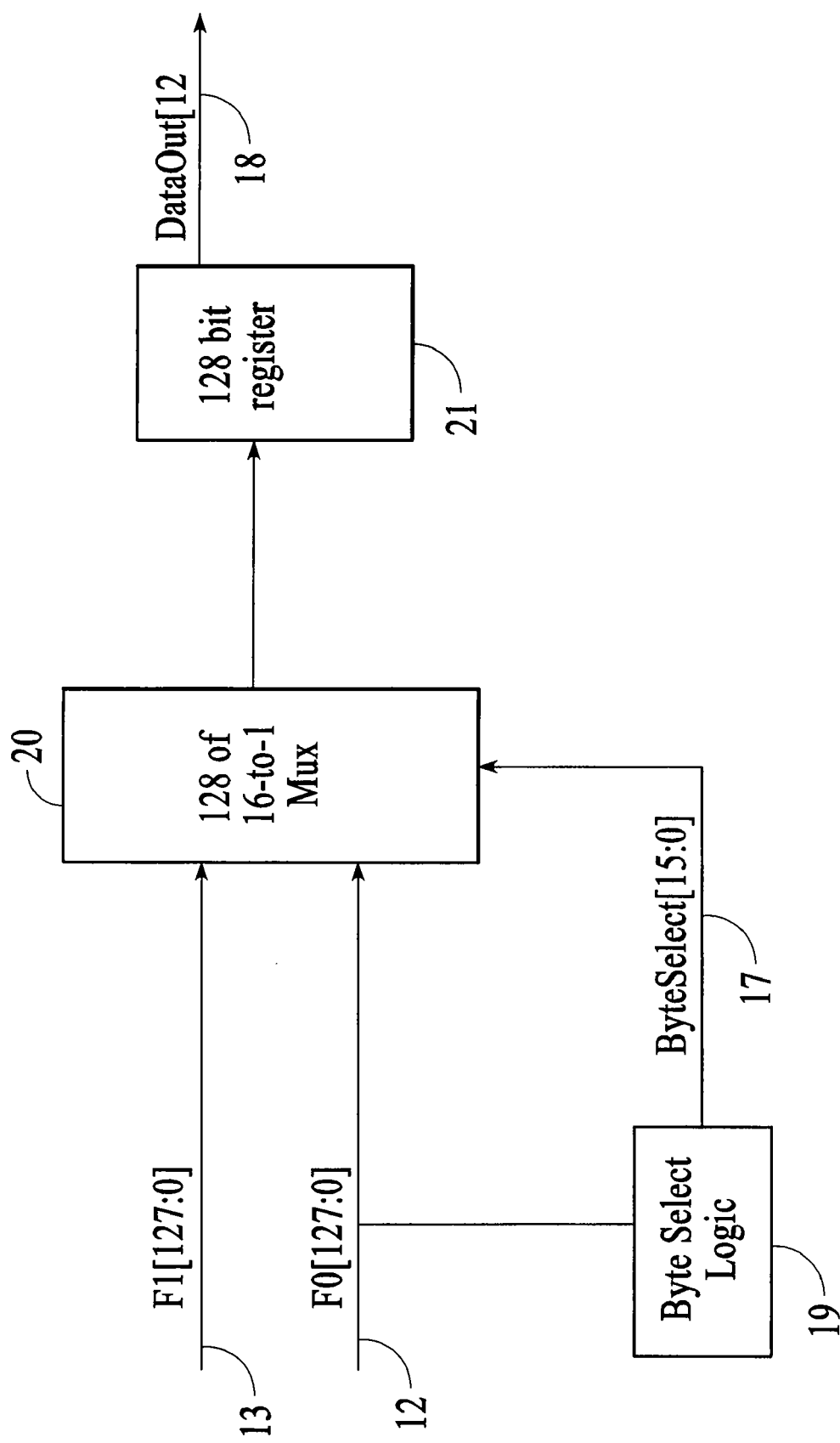
FIG. 5 shows a datapath block diagram of byte realignment according to an embodiment of the present invention.
Figure 6:
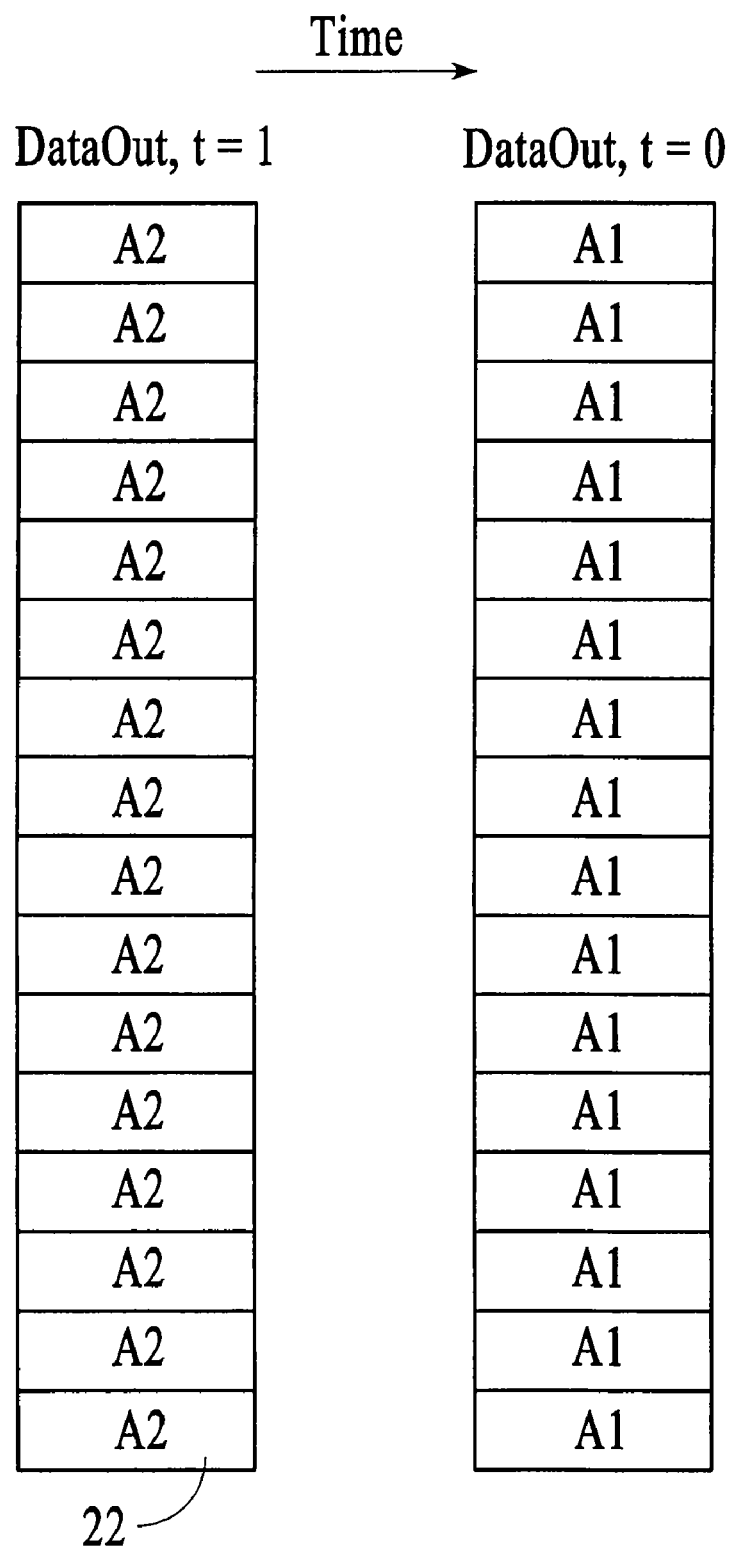
FIG. 6 shows the time varying contents of a data register containing data aligned in accordance to the A1A2 boundary according to an embodiment of the present invention.
Figure 7:
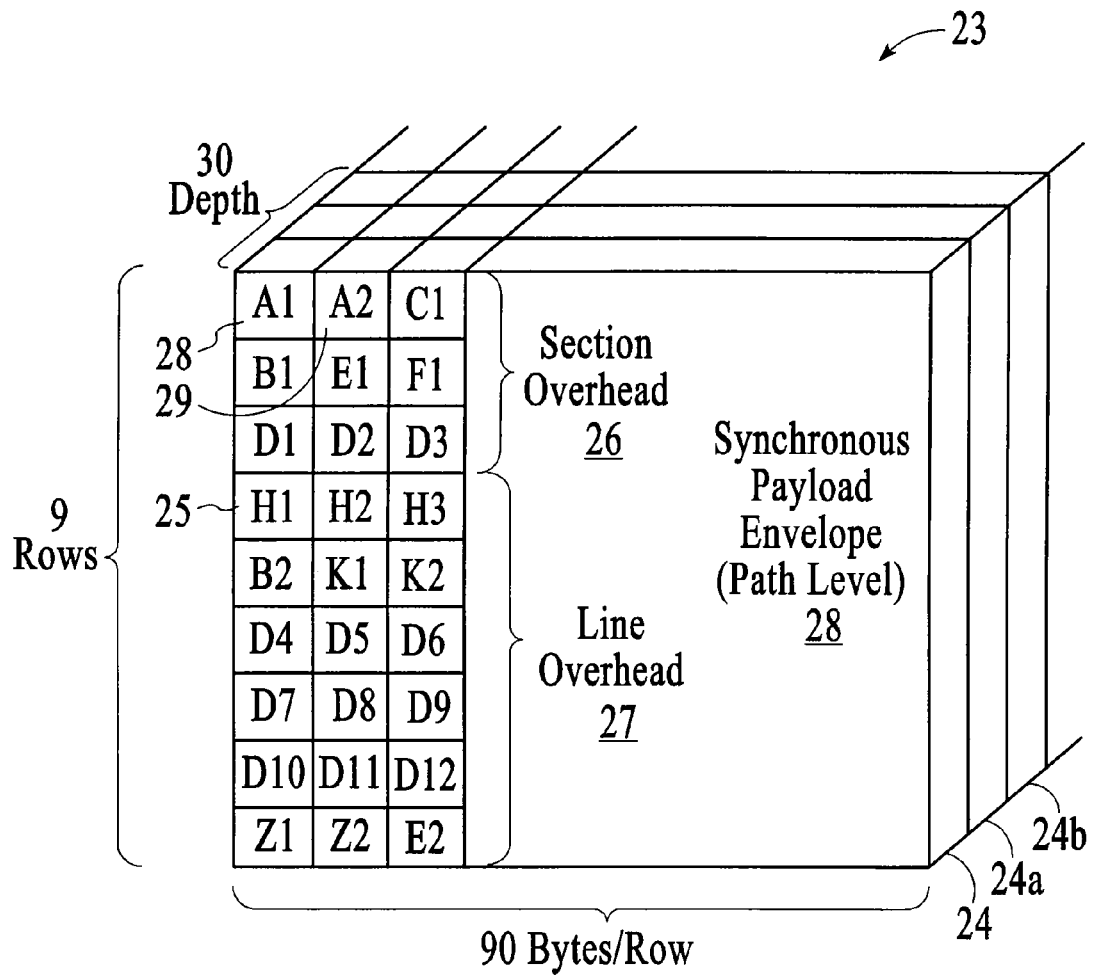
FIG. 7 shows a graphical depiction of an OC-N SONET frame.

The final alignment step in a method according to the present invention, byte shifts the data so that it is aligned along the A1A2 boundary. FIG. 5 shows Byte Select Logic 19, which takes input F0[127:0] 12 from DataReg3 15. The data F0[127:0] 12, is examined to determine the location of the A1A2 boundary, in terms of number of bytes, from the edge of the bus. A 16-bit byte select control signal ByteSelect [15:0] 17 is generated onto bus 17 by the Byte Select Logic 19. FIG. 5 also shows an array 20 of 128 16-to-1 multiplexers accepting both F0[127:0] 12 and F1[127:0] 13 as inputs. The multiplexer array 20 shifts the input data onto an output 128-bit register 21 in accordance with the ByteSelect[15:0] signal on bus 17 such that the output register 21 contains either A1 only or A2 only as is shown in FIG. 6. This final alignment step requires 2 clock cycles to complete.

Figure 10:
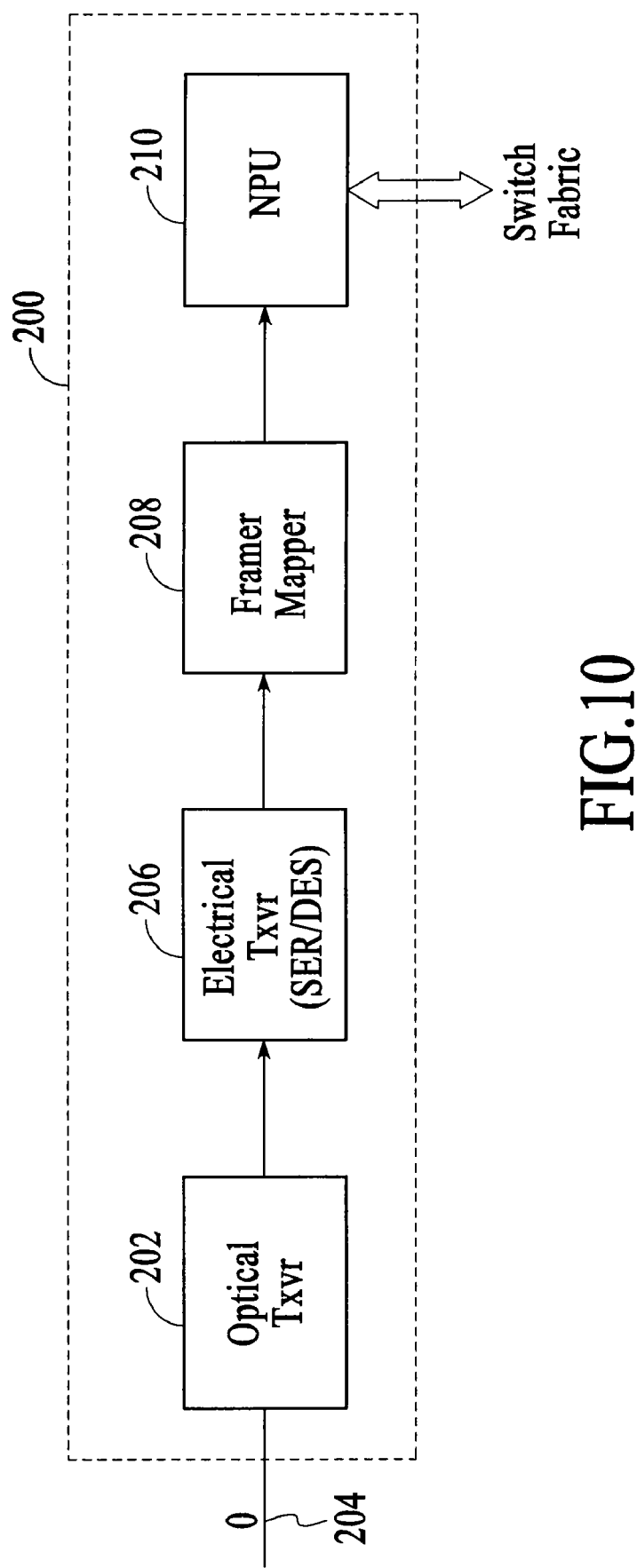
FIG. 10 is a block diagram of a SONET line card with including a framer operating according to an exemplary embodiment of the present invention.

FIG. 10 is a block diagram of a SONET line card 200 that includes a framer implemented according to one embodiment of the present invention. Line card 200 includes an optical transceiver 202 that receives optical data from the fiber channel 204 and converts it to an electrical signal. The output of the optical transceiver 202 connects to an electrical transceiver 206 that performs the SER/DES functionality among others. The deserialized data at the output of electrical transceiver 206 is applied to a framer 208. Framer 208 detects the A1A2 boundary and realigns the data as described above, and forwards it to a network processing unit NPU 210. The NPU 210 interfaces with the switch fabric and performs various functions such as traffic control, protocol conversion and the like.

The SONET line card 200 using the framer 208 according to the present invention has a superior performance due to the speed and efficiency of the framer. The method of the instant invention as applied, for example, to the framer 210 of line card 200, has at least two distinct advantages over prior art methods of aligning data along the A1A2 boundary. First, the method of the present invention as demonstrated in the exemplary embodiment above can accomplish the alignment in as few as five clock cycles. Second, the exemplary implementations of the present method presented herein are far more cost effective in terms of hardware requirements. Simulations have shown that the boundary detector according to the present invention can reduce the amount of circuitry down to as much as only 10% of the logic required by prior art implementations to perform the same function in a similar amount of time.

In conclusion, the present invention provides method and circuitry for detecting a boundary between two bytes of received data. In a specific implementation, the invention detects the A1A2 boundary of a SONET OC-N frame within a reduced number of clock cycles requiring significantly smaller circuitry to implement. While the above provides detailed description of specific embodiments, it is to be understood that various modifications, alternative implementations and equivalents are possible. The scope of the invention should therefore not be limited by the embodiments described above, and should instead by determined by the following claims and their full breadth of equivalents.

What is claimed is:

1. A method of detecting a data boundary in a serial data stream, the method comprising:

receiving a plurality of sets of data bus values from a parallel data bus, wherein each set of data bus values has a first half and a second half, and wherein each set of data bus values is from a serial data stream, and wherein the second half of a set of data bus values contains serial data from the serial data stream that arrives after the first half of the set of data bus values;

comparing a first set of framing patterns with a first half of a first set of data bus values;

comparing a second set of framing patterns with a second half of a subsequent set of data bus values; and determining that a data boundary of the serial data stream is present between the first half of the first set of data bus values and the second half of the subsequent set of data bus values if the first set of framing patterns matches the first half of the first set of data bus values and the second set of framing patterns matches the second half of the subsequent set of data bus values.

2. The method of claim 1, wherein the first set of framing patterns comprises one or more bit shifted versions of a first framing pattern.

3. The method of claim 1, wherein the second set of framing patterns comprises one or more bit shifted versions of a second framing pattern.

4. The method of claim 1, wherein the data boundary is a A1A2 boundary in a SONET frame.

5. The method of claim 1, wherein the serial data stream comprises at least a portion of a SONET frame.

6. The method of claim 1, further comprising aligning the serial data stream with respect to an extent to which the data boundary is byte shifted from an end point of the serial data stream.

7. The method of claim 6, wherein aligning comprises shifting the serial data stream to the extent to which the data boundary is byte shifted.

8. An apparatus, comprising:

a parallel data bus having a first half and a second half configured to transmit sets of data bus values, wherein each set of data bus values is from a serial bus stream;

a register having a first half output and a second half output, coupled to the parallel data bus and configured to store a set of data bus values received from the parallel data bus; and a comparator, coupled to the parallel data bus and the register, configured to compare data bus values on the second half of the parallel data bus and the first half of the register to a first set of framing patterns and a second set of framing patterns, respectively.

9. The apparatus of claim 8, wherein the comparator is further configured to generate output control bits based on a framing pattern in the first set of framing patterns.

10. The apparatus of claim 8, wherein the first set of framing patterns comprises one or more bit shifted versions of a first framing pattern.

11. The apparatus of claim 8, wherein the second set of framing patterns comprises one or more bit shifted versions of the second framing pattern.

12. The apparatus of claim 9, further comprising a multiplexer array configured to use the output bit control bits to shift the data within the first input and the second input.

13. A method of aligning a serial data stream along a data boundary positioned within the serial data stream, the method comprising:

separating a serial data stream into a first data segment and a subsequent data segment, wherein each data segment comprises a first half and a second half;

detecting a data boundary in the first data segment or the subsequent data segment if each byte of a first half of the first data segment equals a first data value and each byte of a second half of the subsequent data segment equals a second data value;

determining an extent to which the data boundary is byte shifted; and aligning the serial data stream with respect to the extent to which the data boundary is byte shifted.

14. The method of claim 13, wherein detecting comprises comparing each byte of the first data segment to a bit shifted version of the first data value.

15. The method of claim 13, wherein detecting comprises comparing each byte of the first data segment to a bit shifted version of the second data value.

16. The method of claim 13, wherein detecting comprises determining when the data boundary is located in a second half of the first data segment.

17. The method of claim 13, wherein detecting comprises determining when the data boundary is located in an first half of the second data segment.

18. The method of claim 13, wherein the data boundary is a A1A2 boundary in a SONET frame.

* * * * *